US010867255B2

(12) United States Patent
Liu et al.

(10) Patent No.: US 10,867,255 B2
(45) Date of Patent: Dec. 15, 2020

(54) EFFICIENT ANNOTATION OF LARGE SAMPLE GROUP

(71) Applicant: Hong Kong Applied Science and Technology Research Institute Company Limited, Hong Kong (HK)

(72) Inventors: Yang Liu, Hong Kong (HK); Chao Feng, Shenzhen (CN); Zhengmairuo Gan, Shenzhen (CN); Zhi Bin Lei, Hong Kong (HK); Yi Xiang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 724 days.

(21) Appl. No.: 15/448,759

(22) Filed: Mar. 3, 2017

(65) Prior Publication Data
US 2018/0253660 A1    Sep. 6, 2018

(51) Int. Cl.
*G06N 20/00*    (2019.01)
*G06N 20/10*    (2019.01)
(Continued)

(52) U.S. Cl.
CPC ............ *G06N 20/00* (2019.01); *G06F 16/23* (2019.01); *G06F 16/24554* (2019.01);
(Continued)

(58) Field of Classification Search
CPC ............ G06F 17/30; G06F 17/30268; G06F 17/30345; G06F 17/30486;
(Continued)

(56) References Cited

U.S. PATENT DOCUMENTS

2004/0111253 A1*   6/2004   Luo ............... G10L 15/1822
                                                    704/4
2010/0076923 A1    3/2010   Hua et al.
(Continued)

FOREIGN PATENT DOCUMENTS

| CN | 102999516 A | 3/2013 |
| CN | 104142912 A | 11/2014 |
| CN | 104462614 A | 3/2015 |

OTHER PUBLICATIONS

Tomanek et al. "An approach to text corpus construction which cuts annotation costs and maintains reusability of annotated data." Proceedings of the 2007 Joint Conference on Empirical Methods in Natural Language Processing and Computational Natural Language Learning (EMNLP-CoNLL), pp. 486-495. (Year: 2007).*
(Continued)

*Primary Examiner* — Kamran Afshar
*Assistant Examiner* — Randall K. Baldwin
(74) *Attorney, Agent, or Firm* — Spruson & Ferguson (Hong Kong) Limited

(57) ABSTRACT

A method for annotating a batch of original samples is provided. A first subset of original samples, selected from the batch and determined by minimizing an entropy-mean difference between the first subset and the batch, is used for human annotation to yield human-annotated samples. The human-annotated samples are used as training data to configure an annotation process for annotating an input sample to yield an annotated output sample, and a check process for verifying annotation accuracy of the annotated output sample. Remaining original samples in the batch are processed by the annotation process to yield machine-annotated samples, whose accuracy is verified by the check process. In one embodiment, part of the original samples corresponding to erroneous machine-annotated samples are selected for human annotation. Resultant additional human-annotated
(Continued)

samples are used to update the two processes. The remaining original samples not yet annotated are then processed by the two processes.

19 Claims, 3 Drawing Sheets

(51) Int. Cl.
    *G06N 3/02*         (2006.01)
    *G06F 16/23*       (2019.01)
    *G06F 16/28*       (2019.01)
    *G06F 16/2455*    (2019.01)
    *G06F 16/2457*    (2019.01)

(52) U.S. Cl.
    CPC ...... *G06F 16/24573* (2019.01); *G06F 16/285* (2019.01); *G06N 3/02* (2013.01); *G06N 20/10* (2019.01)

(58) Field of Classification Search
    CPC ......... G06F 17/30525; G06F 17/30598; G06F 17/30722; G06F 17/30752; G06K 9/62; G06K 9/6223; G06N 99/00; G06N 99/005; G06N 20/00; G06N 20/10; G06N 3/02
    See application file for complete search history.

(56) References Cited

U.S. PATENT DOCUMENTS

| | | | | |
|---|---|---|---|---|
| 2012/0158633 A1* | 6/2012 | Eder | ...................... | G06N 5/022 706/46 |
| 2012/0310864 A1* | 12/2012 | Chakraborty | .......... | G06N 20/00 706/12 |
| 2013/0097103 A1* | 4/2013 | Chari | ...................... | G06N 20/00 706/12 |
| 2015/0356260 A1* | 12/2015 | D'Souza | ............... | G06F 19/328 705/2 |
| 2016/0307113 A1* | 10/2016 | Calapodescu | ......... | G06F 16/285 |
| 2018/0068222 A1* | 3/2018 | Brennan | ................ | G06N 5/022 |

OTHER PUBLICATIONS

Kovashka, Adriana, Sudheendra Vijayanarasimhan, and Kristen Grauman. "Actively selecting annotations among objects and attributes." 2011 International Conference on Computer Vision. IEEE, 2011, pp. 1403-1410. (Year: 2011).*

Davis, Alexandre, et al. "Named entity disambiguation in streaming data." Proceedings of the 50th Annual Meeting of the Association for Computational Linguistics: Long Papers—vol. 1. Association for Computational Linguistics, pp. 815-824. (Year : 2012).*

Yan et al. "Image classification by cross-media active learning with privileged information." IEEE Transactions on Multimedia 18.12 (2016): 2494-2502. (Year: 2016).*

Sun, Fuming, Yan Xu, and Jun Zhou. "Active learning SVM with regularization path for image classification." Multimedia Tools and Applications 75.3 (2016): 1427-1442. (Year: 2016).*

Holub, Alex, Pietro Perona, and Michael C. Burl. "Entropy-based active learning for object recognition." 2008 IEEE Computer Society Conference on Computer Vision and Pattern Recognition Workshops. IEEE, 2008: 1-8 (Year: 2008).*

International Search Report and Written Opinion of PCT application No. PCT/CN2017/075796 issued from the International Search Authority dated Nov. 8, 2017.

First Office Action with Search Report of CN201780000167.X issued by the China National Intellectual Property Administration (CNIPA) of the PRC dated Nov. 20, 2019.

Yan Xu; Research on Image Annotation Based Active Learning; China Master's Theses Full-text Database; Jul. 15, 2014; vol. 2014, Issue 7; section1.2.2, 2.1.1.1-2.1.2, figure 2.2.

Chen et al.; Active Learning Based on Information Entropy for Semi-Supervised Classification; Computer Technology and Development; Feb. 28, 2020; vol. 20, Issue 2; pp. 110-113.

* cited by examiner

EFFICIENT ANNOTATION OF LARGE SAMPLE GROUP

FIELD OF THE INVENTION

The present invention generally relates to a computer-implemented method for annotating a batch of samples. In particular, the present invention relates to such method where human annotation is used in annotating base cases and special cases among the samples while remaining samples are machine-annotated.

BACKGROUND

With the popularity of the Internet and social media, digital objects are generated at a rapid rate. These digital objects are usually multimedia, e.g., videos, images, audio files, texts, and a combination thereof. Annotation of the digital objects improves their searchability. By annotation, a digital object is tagged with metadata for describing the digital object, such as one or more keywords. Although searching for desired object(s) in a pool containing a large number of digital objects is made efficient by annotation, annotating a large number of digital objects is a technical challenge in its own weight.

Generally, machine learning algorithms are used in classifying digital objects for annotation. Initial classifier training is needed for intelligent cognitive systems. Digital objects that are initially used for training a classifier are first manually annotated by human annotation. Human annotation is undoubtedly a time-consuming costly process. It is desirable if human effort can be reduced in annotation. More concretely, it is preferable if a smaller number of digital objects from a pool of digital objects are selected to be human-annotated for training the classifier. However, most of existing techniques in annotation, such as the techniques proposed in CN104142912A, CN102999516A and US2010/0076923A1, are targeted to another aspect of increasing annotation accuracy of the classifier under the assumption that the available training samples are already annotated. There is a need in the art for a technique that reduces or minimizes the number of digital objects selected for human annotation.

SUMMARY OF THE INVENTION

A first aspect of the present invention is to provide a computer-implemented method for annotating a batch of original samples.

In the method, a first subset of original samples is selected from the batch for human annotation to yield human-annotated samples. The first subset is determined by optimizing the first subset in a sense of minimizing a difference between an entropy mean of the first subset and an entropy mean of the batch. The entropy mean of any set of original samples is computed by averaging entropy values of the original samples belonging to the aforementioned set. After the human-annotated samples are obtained, the original samples belonging to the selected first subset are removed from the batch. The human-annotated samples are used as training data to configure at least an annotation process for annotating an input sample to yield an annotated output sample. The annotation process after configuration is used for annotating any original sample remaining in the batch.

Preferably, the human-annotated samples are also used as training data to configure a check process for verifying annotation accuracy of the annotated output sample. In addition, an annotate-and-check process is performed on any original sample remaining in the batch. The annotate-and-check process comprises the following steps. An individual original sample remaining in the batch is annotated by the annotation process to yield an individual machine-annotated sample. Annotation accuracy of the individual machine-annotated sample is verified by the check process. If the individual machine-annotated sample is verified to be accurate in annotation, the individual original sample is removed from the batch; otherwise, the individual machine-annotated sample is discarded. An optional step is to generate a verification result for the individual original sample. The verification result includes the individual original sample, the individual machine-annotated sample, and an indication of whether the individual machine-annotated sample is accurate. If the batch is not empty after the annotate-and-check process is performed, an update process is performed.

In one embodiment of the update process, a second subset of original samples is selected from the batch for human annotation to yield additional human-annotated samples. After the additional human-annotated samples are obtained, the original samples belonging to the selected second subset are removed front the batch. The additional human-annotated samples are used as additional training data to update the annotation process and the check process. If the batch is not empty after the update process is performed, the annotate-and-check process is repeated.

In another embodiment of the update process, the annotation process and the check process are updated according to one or more verification results obtained in the annotate-and-check process. In particular, all or part of the one or more of the verification results are used as additional training data to update the annotation process and the check process. After the update process is completed, the annotate-and-check process is repeated.

A second aspect of the present invention is to provide a computer-implemented method for annotating a group of original samples. The method comprises clustering the original samples in the group so as to partition the group into one or more clusters of original samples. Each cluster of original samples is annotated according to any embodiment of the method as set forth in the first aspect of the present invention.

Other aspects of the present invention are disclosed as illustrated by the embodiments hereinafter.

BRIEF DESCRIPTION OF THE DRAWINGS

FIG. 24 depicts the first round of processing and FIG. 2B depicts the second round of processing.

DETAILED DESCRIPTION

The following definitions are used herein in the specification and appended claims. "A sample" means a digital object. The digital object is a non-physical digital content in a computer environment. In most cases, the digital object is a multimedia content, such as a video, an image, an audio file, a text or a textual document, or a combination thereof. "An original sample" means a raw sample that is not annotated or is only pre-annotated. "Pre-annotation" is different from "annotation" in the following sense. For an original sample that is not annotated, the original sample does not contain any annotation message in association with the original sample. The original sample is the raw sample. For an original sample that is pre-annotated, the raw sample is associated with a first annotation message to form the original sample but the first annotation message is to be replaced by a second annotation message by a certain annotation process. The first annotation message may be used, for example, as an input to the annotation process so as to improve the first annotation message in annotation description and to thereby yield the second annotation message. In one practical example, the first annotation message is examined by a person to prepare the second annotation message with a more accurate description to the original sample in human annotation. "An annotated sample" means a resultant sample that is obtained by annotating an original sample. The annotated sample is formed by associating an annotation message to the raw sample in the original sample. Usually, the annotated sample is the raw sample tagged with the annotation message, or is represented by a data structure at least including the raw sample as one field and the annotation message as another field. For the annotated sample, it can be classified as a human-annotated sample or a machine-annotated sample. "A human-annotated sample" means an annotated sample obtained by human annotation of an original sample. "A machine-annotated sample" means an annotated sample whose annotation message is determined entirely by computer processing.

Figure 1:
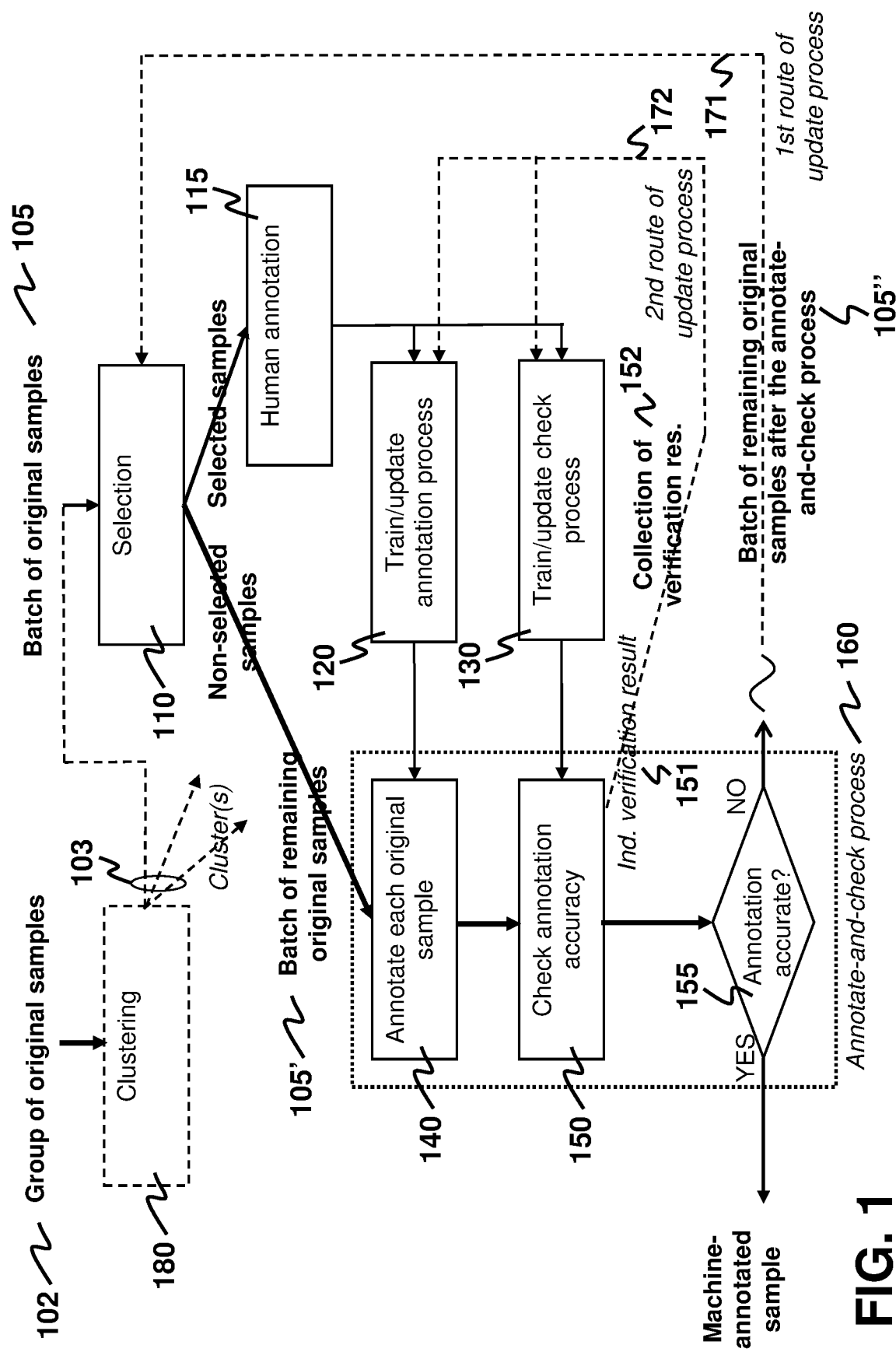
FIG. 1 depicts a flowchart of annotating a batch of original samples in accordance with the present invention.

A first aspect of the present invention is to provide a computer-implemented method for annotating a batch of original samples. In the method, a subset of the batch is selected for human annotation. In the selection of the subset, human annotation is focused only on base cases and special cases of the original samples whereas machine annotation is used to annotate remaining original samples, thus advantageously minimizing or at least reducing the number of samples for human annotation. The Inventors have found that the base cases and the special cases can be identified according to art entropy value of each original sample. The method is illustrated with an aid of FIG. 1, which depicts a flowchart of annotating a batch of original samples 105.

An exemplary embodiment of the method is elaborated as follows.

In a step 110, a first subset of original samples is selected from the batch 105. Generally, a pre-determined fraction of the number of original samples in the batch 105 is selected for the first subset. However, it is not always the case, for example, when the number of original samples for human annotation is required to be upper-bounded due to resource limitation. The original samples in the first subset are used for human annotation to yield human-annotated samples (step 115). In the step 110, the first subset of original samples is advantageously determined by optimizing the first subset in a sense of minimizing a difference between an entropy mean of the first subset and an entropy mean of the batch. The entropy mean of any set of original samples is computed by averaging entropy values of the original samples belonging to the aforementioned set. The entropy value of an individual original sample is obtained through the following four steps.

First, split the individual original sample into plural constituent elements $\{y_j\}$. The constituent elements belong to the same type of feature. As illustrative examples, for four samples that are respectively a text, an image, a video and an audio signal, the corresponding feature types may be chosen to be a word, a sub-image, a key frame, and a time/frequency component of the audio signal, respectively.

Second, identify distinct constituent elements $\{x_i\}$ from $\{y_j\}$ such that each element in $\{y_j\}$ is also found in $\{x_i\}$.

Third, estimate $P(x_i)$, a probability of $x_i$, according to the number of one or more constituent elements in $\{y_j\}$ equal to $x_i$. In particular, $P(x_i)$ is estimated as the relative frequency of occurrence of $x_i$ over the constituent elements $\{y_j\}$.

Four, compute the entropy value of the individual original sample as $-\Sigma_i P(x_i) \log_b P(x_i)$ where b is a base. Practically and preferably in the implementation of the disclosed method, b=2 is used.

An example is provided as follows for illustrating the computation of the entropy value of the individual original sample. Consider a sample that is a string "cat hat bat". The string can be regarded as a data set {cat, hat, bat}. The feature type is chosen to be an English letter. Hence, each constituent element of the sample is an English letter. Note that spaces in the string are excluded to be constituent elements. It follows that the sample is split into 9 constituent elements {c, a, t, h, a, t, b, a, t}, regarded as $\{y_j\}$ above with j=1, . . . , 9. There are 5 distinct constituent elements {a, t, c, h, b}, regarded as $\{x_i\}$ above with i=1, . . . , 5. By counting: $P(x_1)$ for "a" is estimated to be $P(x_1)=3/9=1/3$; $P(x_2)$ for "t" is estimated to be 1/3; and $P(x_5)$ for "b" is estimated to be 1/9. The entropy of letter "a" is computed by $-P(x_1) \log_2 P(x_1)=0.52$, the entropy of letter "b" is computed by $-P(x_5) \log_2 P(x_5)=0.35$. We say that letter "b" is less informative than letter "a" in this case since the entropy of "b" is lower than that of "a". The implication is that, if letter "b" is given as a part of input, it can be inferred that the input is very likely to be the word "bat". On the other hand, if letter "a" is given as a part of input, one has no idea on what the input has been. In addition, the entropy of a word is the sum of individual entropies of the letters of the word. The entropy mean of the whole data set is the sum of entropies of all the words in the string and then divided by the number of words (3 in this example). If a picture is used as another sample, the picture can be transformed to a grey-scale picture and can be divided into small blocks (i.e. sub-images). When each block is small enough, each small block of the picture can be regarded as a letter of a word in entropy computation.

The advantage of minimizing the entropy-mean difference between the first subset and the batch 105 in the selection of the first subset is evidenced as follows. The entropy value of the individual original sample is a measure of an amount of information of this sample. By finding the first subset where the difference between the entropy means of the first subset and of the batch 105 is minimized or relatively small over all possible candidate subsets of the batch, the amounts of information for both the first subset and the batch 105 are likely to be close. It follows that the first subset is likely to contain original samples representative to all the original samples in the batch 105. It follows that machine learning and classifier training based on these representative original samples and resultant human-annotated samples is less likely to be misguided. These representative original samples form "the base cases" as mentioned above.

After the human-annotated samples are obtained in the step 115, the original samples belonging to the selected first subset are removed from the batch 105. Removing these original samples from the hatch 105 is simply an indication that these original samples have been annotated and do not require machine annotation.

The human-annotated samples are used as training data to configure at least an annotation process for annotating an input sample to yield an annotated output sample (step 120). The annotation process after configuration is used in step 140 for annotating any original sample remaining in the batch 105'. (The reference numeral 105' is used instead of 105 in order to indicate that the batch 105' may have been reduced in size when compared to the original batch 105 at the beginning.). Usually, the annotation process uses a machine-learning algorithm to classify the input sample. The machine-learning algorithm may be selected from a named-entity recognition (NER) classifier, a support vector machine (SVM) classifier and a neural network. In the art, there are NER systems that use linguistic grammar-based techniques as well as statistical models, i.e. machine learning. Hand-crafted grammar-based systems typically obtain better precision, but at the cost of lower recall and months of work by experienced computational linguists. Statistical NER systems typically require a large amount of manually annotated training data. Semi-supervised approaches may be used to avoid part of the annotation effort. Many different classifier types have been used in the art to perform machine-learned NER, with conditional random fields being a typical choice.

Generally, a selection process is used in the step 110 for selecting the first subset of original samples from the batch 105.

In one embodiment of the selection process, a candidate subset of original samples is selected from the batch 105. The entropy value of each original sample in the candidate subset is then computed. The entropy mean of the candidate subset is thereby computed by averaging the entropy values of original samples that belong to the candidate subset. The entropy mean of the batch of original samples 105 is similarly computed. By iteration, the candidate subset is iteratively improved or refined in a direction of minimizing a difference between the entropy mean of the candidate subset and the entropy mean of the batch 105. Finally, the first subset is given by the candidate subset after a certain number of iterations. The number of iterations may be a pre-determined one. Alternatively, the iteration may be stopped when an incremental reduction of the entropy mean is less than a certain pre-determined threshold.

In another embodiment of the selection process, plural candidate subsets of original samples are selected front the batch 105. The candidate subsets may be mutually non-overlapping or not. For each individual candidate subset, the entropy value of each original sample in the individual candidate subset is computed. The entropy mean of the individual candidate subset is computed by averaging the entropy values of original samples that belong to the individual candidate subset. The entropy mean of the batch 105 is similarly computed. Finally, among all the candidate subsets, the particular candidate subset having the entropy mean closest to the entropy mean of the batch 105 is selected to be the first subset.

Additional embodiments of the method are elaborated as follows.

It is desirable if annotation accuracy of machine-annotated samples generated by the annotation process in the step 140 is verified such that those machine-annotated samples not accurate in annotation can be identified and thereby discarded. In addition to having the annotation process for annotating the input sample to yield the annotated output sample, preferably a check process for verifying annotation accuracy of the annotated output sample is also used. Particularly, the human-annotated samples generated in the step 115 are also used as training data to configure the check process (step 130). The check process may use a machine-learning algorithm selected from a NER classifier, a SYM classifier and a neural network. Alternatively, the check process may use an algorithm based on regular expressions. Yet in another option, the annotation process and the check process use a same threshold-based machine-learning algorithm but employ different thresholds.

By incorporating both the annotation process and the check process, an annotate-and-check process 160 is formed and is performed on any original sample remaining in the batch 105'. The annotate-and-check process 160 comprises the following steps. An individual original sample remaining in the batch 105' is annotated by the annotation process to yield an individual machine-annotation sample (the step 140). Annotation accuracy of the individual machine-annotated sample is verified by the check process (step 150). Optionally, a verification result 151 for the individual original sample is generated in the step 150. One use of the verification result 151 is in an update process to be detailed soon. The verification result 151 includes the individual original sample, the individual machine-annotated sample, and an indication of whether the individual machine-annotated sample is accurate. If the individual machine-annotated sample is verified to be accurate in annotation in the step 150, then the individual original sample is removed from the batch 105', or else the individual machine-annotated sample is discarded (step 155). Note that the discard of the individual machine-annotation sample implies that the individual original sample is required to be re-annotated. The annotate-and-check process 160 is performed on all the original samples in the batch 105'. Thereafter, the batch of remaining original samples requiring re-annotation is designated by reference 105" for convenience.

If the batch 105" is not empty, an update process is performed. Herein it is provided with two options of the update process.

In a first option of the update process 171, a second subset of original samples is selected from the batch 105" by performing the step 110 again. Preferably, the selection process used for selecting the first subset is also used for selecting the second subset. The second subset of original samples is used for human annotation to yield additional human-annotated samples by performing the step 115 again. Following the approach mentioned above in identifying the base cases, one can find that the original samples in the second subset are "the special cases" as mentioned above. The additional human-annotated samples are used as additional training data to update the annotation process and the check process in the steps 120 and 130, respectively. After the additional human-annotated samples are obtained, the original samples belonging to the selected second subset are removed from the batch 105". If the batch 105' (after the step 110 is performed on the hatch 105") is not empty after the update process is completed, then the annotate-and-check process 160 is repeated for the batch 105'. If the batch 105' is empty after completion of the update process, it means that all the original samples originally in the batch 105" were already selected for human annotation during performing the step 110. This situation may happen if the number of original samples originally in the batch 105" is already very low, e.g., less than a pre-determined small integer such as 2.

In a second option of the update process 172, a collection 152 having one or more verification results, each being the individual verification result 151, is first obtained. All or part of the one or more verification results in the collection 152 are selected and directly used as additional training data to update the annotation process and the check process. Human annotation is not involved in the update process. Thus, the second option of the update process 172 has an advantage over the first option 171 in that a human personnel for human annotation is not required to be standby over the entire course of machine annotation.

It is possible to benchmark quality of annotating the batch of original samples 105. The quality of annotating the batch 105 is obtained by processing the original samples belonging to the selected first subset with the annotate-and-check process 160 and then checking the collection 152 of the one or more verification results with the human-annotated samples. The benchmarking is preferably performed right after the annotation process and the check process are initially configured by the human-annotated samples, for an advantage that whether or not further improvement on the annotate-and-check process 160 may be required before the original samples in the batch 105' are annotated. If it is found that further improvement is required, one may expand the first subset of original samples, and repeat performing human annotation 115 and configuring the annotation process and the check process in the steps 120, 130.

Figure 2A:
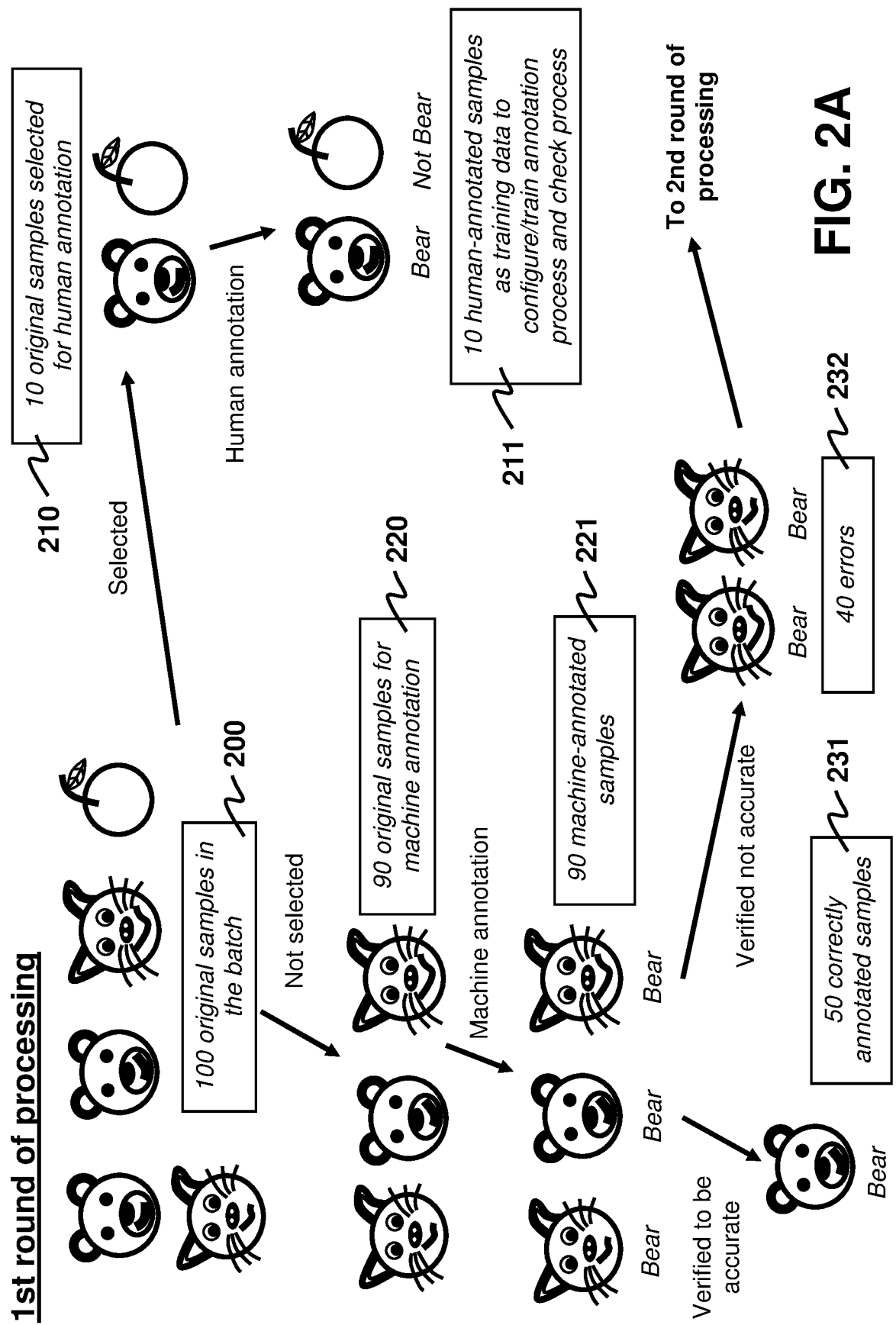
FIGS. 2A and 2B provide an example for illustrating the flow of processing in annotating the batch of original samples, where
Figure 2B:
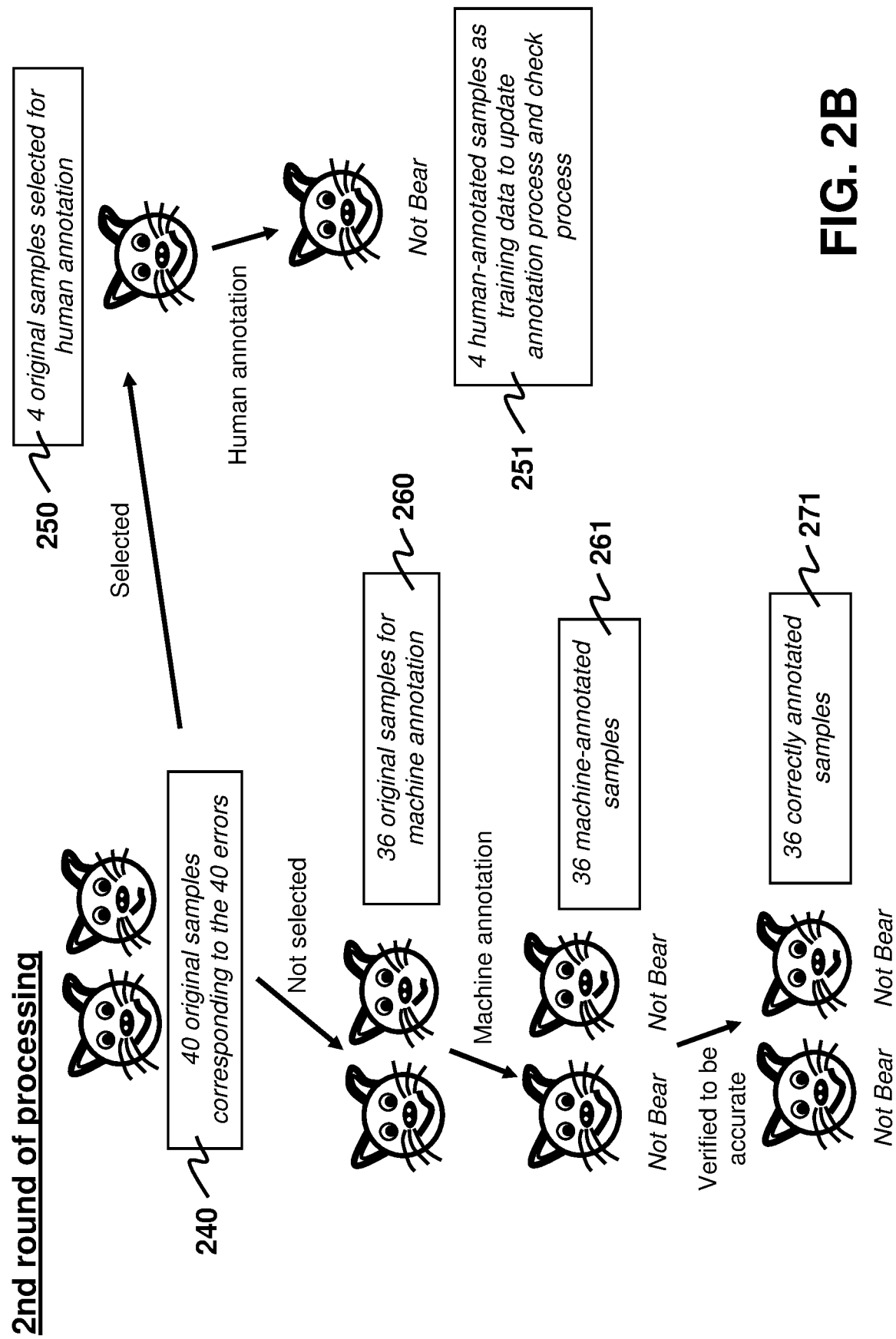

One example is provided for illustrating the execution of the disclosed method by considering a case of annotating 100 original samples (as the batch of original samples 105). For the purpose of illustration, it is assumed that the 100 original samples are not pre-annotated, the first option of the update process 171 is used, and two rounds of processing are adequate to annotate all the 100 original samples. The execution of the method for the second option of the update process 172 is similar and is not repeated. FIGS. 2A and 2B depict the flows of processing for the first and second rounds, respectively.

Refer to FIG. 2A, which depicts the first round of processing. A batch of 100 original samples 200 is partitioned into a first plurality of 10 original samples selected for human annotation 210 and a second plurality of 90 original samples for machine annotation 220 (corresponding to the step 110). The first plurality of original samples 210 are human-annotated (corresponding to the step 115) to yield a third plurality of 10 human-annotated samples 211. The third plurality of human-annotated samples 211 is used to train an annotation process (corresponding to the step 120) and a check process (corresponding to the step 130). After the annotation process and the check process are trained, the second plurality of original samples 220 are machine-annotated by the annotation process (corresponding to the step 140) to yield a fourth plurality of 90 machine-annotated samples 221. The fourth plurality of machine-annotated samples 221 is processed by the check process to verify each machine-annotated sample therein (corresponding to the step 150). As a result of verification, the fourth plurality of machine-annotated samples 221 is partitioned into a fifth plurality of 50 machine-annotated samples determined to be correctly annotated 231, and a sixth plurality of 40 machine-annotated samples that are determined to be erroneously annotated 232. The first around of processing ends, and 60 out of 100 original samples are correctly annotated. The remaining 40 original samples, collectively corresponding to the sixth plurality of erroneous machine-annotated samples, form a seventh plurality of 40 original samples 240 to be handled in the second round of processing. The sixth plurality of erroneous machine-annotated samples 232 is discarded.

Refer to FIG. 2B, which depicts the second around of processing. The seventh plurality of original samples 240 is partitioned into an eighth plurality of 4 original samples for human annotation 250 and a ninth plurality of 36 original samples for machine annotation 260 (corresponding to a second-time execution of the step 110). The eighth plurality of original samples 250 is human-annotated (corresponding to the second-time execution of the step 115) to form a tenth plurality of 4 additional human-annotated samples 251 to be used as additional training data to update the annotation process and the check process (corresponding to the steps 120 and 130). After the annotation process and the check process are updated, the ninth plurality of original samples 260 is annotated by the annotation process (corresponding to the step 140) to give an eleventh plurality of 36 machine-annotated samples 261. By the checking process (corresponding to the step 150), all the 36 samples in the eleventh plurality of machine-annotated samples 261 are determined to have accurate annotation. Hence, a twelfth plurality of 36 machine-annotated samples determined to be correctly annotated 271 is obtained. At the end of the second round of processing, all the 100 original samples originally in the batch 200 have been annotated. The set of 100 annotated samples consists of the third plurality of 10 human-annotated samples 211, the fifth plurality of 50 machine-annotated samples determined to be correctly annotated 231, the tenth plurality of 4 additional human-annotated samples 251, and the twelfth plurality of 36 machine-annotated samples determined to be correctly annotated 271.

A second aspect of the present invention is to provide a computer-implemented method for annotating a group of original samples based on the method disclosed above according to the first aspect.

Refer to FIG. 1 again. A group of original samples 102 is to be annotated. The original samples in the group 102 are first clustered in a step 180 so as to partition the group 102 into one or more clusters of original samples 103. Each of the one or more clusters 103 is annotated according to any embodiment of the method disclosed above according to the first aspect of the present invention, where each cluster of original samples is treated as the batch of original samples 105.

In the step 180, K-mean clustering may be used to cluster the original samples in the group 102.

In practical implementation, it is possible that each original sample in the group 102 is provided with pre-annotation data. A data structure for an individual original sample in the group 102 may be formed by including the individual original sample and the pre-annotation data thereof. A plurality of data structures for all the original samples in the group 102 is thereby obtained. In the step 180, K-mean clustering of the plurality of data structures may be performed to cluster the original samples in the group 102.

In annotating an individual cluster of original samples, the number of the original samples in the first subset selected in the step 110 is a usually pre-determined fraction of the number of the original samples in the aforementioned individual cluster. In one option, the pre-determined fraction is unique for all the one or more clusters 103.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method for annotating a batch of original samples, comprising:
    selecting a first subset of original samples from the batch for human annotation to yield human-annotated samples, wherein the first subset is determined by optimizing the first subset in a sense of minimizing a difference between an entropy mean of the first subset and an entropy mean of the batch, and wherein an entropy mean of a set of original samples is computed by averaging entropy values of respective original samples belonging to said set;
    after the human-annotated samples are obtained, removing the original samples belonging to the selected first subset from the batch;
    using the human-annotated samples as training data to configure an annotation process for annotating an input sample to yield an annotated output sample, whereby the annotation process after configuration is used for annotating any original sample remaining in the batch;
    using the human-annotated samples as training data to configure a check process for verifying annotation accuracy of the annotated output sample;
    performing an annotate-and-check process on an individual original sample remaining in the batch, wherein the annotate-and-check process comprises:
        annotating the individual original sample remaining in the batch by the annotation process to yield an individual machine-annotated sample;
        verifying annotation accuracy of the individual machine-annotated sample by the check process; and
        if the individual machine-annotated sample is verified to be accurate in annotation, then removing the individual original sample from the batch, else discarding the individual machine-annotated sample;
    if the batch is not empty after the annotate-and-check process is performed, performing an update process, wherein the update process comprises:
        selecting a second subset of original samples from the batch for human annotation to yield additional human-annotated samples;
        using the additional human-annotated samples as additional training data to update the annotation process and the check process; and
        after the additional human-annotated samples are obtained, removing the original samples belonging to the selected second subset from the batch;
    and
    if the batch is not empty after the update process is performed, repeating the annotate-and-check process.

2. The method of claim 1, wherein each of the first and second subsets is a third subset of original samples selected from the batch, the third subset being determined by a selection process comprising:
    selecting a candidate subset of original samples from the batch;
    computing the entropy mean of the candidate subset; and
    iteratively improving the candidate subset in a direction of minimizing a difference between the entropy mean of the candidate subset and the entropy mean of the batch, whereby the third subset is given by the candidate subset after a number of iterations.

3. The method of claim 1, wherein each of the first and second subsets is a third subset of original samples selected from the batch, the third subset being determined by a selection process comprising:
    selecting plural candidate subsets of original samples from the batch;
    computing the entropy mean of each candidate subset; and
    selecting, among all the candidate subsets, the candidate subset having the entropy mean closest to the entropy mean of the batch to be the third subset.

4. The method of claim 1, wherein the annotation process uses a machine-learning algorithm selected from a named-entity recognition (NER) classifier, a support vector machine (SVM) classifier and a neural network.

5. The method of claim 1, wherein the check process uses a machine-learning algorithm selected from a named-entity recognition (NER) classifier, a support vector machine (SVM) classifier and a neural network.

6. The method of claim 1, wherein the check process uses an algorithm based on regular expressions.

7. The method of claim 1, wherein the annotation process and the check process use a same threshold-based machine-learning algorithm but employ different thresholds.

8. A computer-implemented method for annotating a group of original samples, comprising:
    clustering the original samples in the group so as to partition the group into one or more clusters of original samples; and
    annotating each cluster of original samples according to the method of claim 1.

9. The method of claim 8, wherein K-mean clustering is used in the clustering of the original samples in the group.

10. The method of claim 8, wherein:
    each original sample in the group is provided with pre-annotation data;
    the method further comprises forming a data structure for an individual original sample in the group by including the individual original sample and the pre-annotation data thereof, whereby a plurality of data structures for all the original samples in the group is obtained; and
    K-mean clustering of the plurality of data structures is performed in the clustering of the original samples in the group.

11. The method of claim 8, wherein:
    in the annotating of an individual cluster of original samples, a number of the original samples in the first subset is a pre-determined fraction of a number of the original samples in the individual cluster; and
    the pre-determined fraction is unique for all the clusters.

12. A computer-implemented method for annotating a batch of original samples, comprising:
    selecting a first subset of original samples from the batch for human annotation to yield human-annotated samples, wherein the first subset is determined by optimizing the first subset in a sense of minimizing a difference between an entropy mean of the first subset and an entropy mean of the batch, and wherein an entropy mean of a set of original samples is computed by averaging entropy values of respective original samples belonging to said set;
    after the human-annotated samples are obtained, removing the original samples belonging to the selected first subset from the batch;
    using the human-annotated samples as training data to configure an annotation process for annotating an input sample to yield an annotated output sample, whereby the annotation process after configuration is used for annotating any original sample remaining in the batch;

using the human-annotated samples as training data to configure a check process for verifying annotation accuracy of the annotated output sample;

performing an annotate-and-check process on an individual original sample remaining in the batch, wherein the annotate-and-check process comprises the steps of:
- (a) annotating the individual original sample remaining in the batch by the annotation process to yield an individual machine-annotated sample;
- (b) verifying annotation accuracy of the individual machine-annotated sample by the check process, whereby a verification result for the individual original sample is generated, the verification result including the individual original sample, the individual machine-annotated sample, and an indication of whether the individual machine-annotated sample is accurate;
- (c) if the individual machine-annotated sample is verified to be accurate in annotation, then removing the individual original sample from the batch, else discarding the individual machine-annotated sample; and
- (d) repeating the steps (a)-(c) for each original sample in the batch, whereby one or more verification results are obtained;

and if the batch is not empty after the annotate-and-check process is performed, performing an update process and then repeating the annotate-and-check process, wherein the update process comprises:
selecting all or part of the one or more of the verification results as additional training data to update the annotation process and the check process.

13. The method of claim 12, wherein the first subset of original samples is determined by a selection process comprising:
selecting a candidate subset of original samples from the batch;
computing the entropy mean of the candidate subset; and
iteratively improving the candidate subset in a direction of minimizing a difference between the entropy mean of the candidate subset and the entropy mean of the batch, whereby the first subset is given by the candidate subset after a number of iterations.

14. The method of claim 12, wherein the first subset of original samples is determined by a selection process comprising:
selecting plural candidate subsets of original samples from the batch;
computing the entropy mean of each candidate subset; and
selecting, among all the candidate subsets, the candidate subset having the entropy mean closest to the entropy mean of the batch to be the first subset.

15. A computer-implemented method for annotating a group of original samples, comprising:
clustering the original samples in the group so as to partition the group into one or more clusters of original samples; and
annotating each cluster of original samples according to the method of claim 12.

16. The method of claim 15, wherein K-mean clustering is used in the clustering of the original samples in the group.

17. The method of claim 15, wherein:
each original sample in the group is provided with pre-annotation data;
the method further comprises forming a data structure for an individual original sample in the group by including the individual original sample and the pre-annotation data thereof, whereby a plurality of data structures for all the original samples in the group is obtained; and
K-mean clustering of the plurality of data structures is performed in the clustering of the original samples in the group.

18. The method of claim 15, wherein:
in the annotating of an individual cluster of original samples, the number of the original samples in the first subset is a pre-determined fraction of the number of the original samples in the individual cluster; and
the pre-determined fraction is unique for all the clusters.

19. The method of claim 12, further comprising:
benchmarking quality of annotating the batch of original samples by processing the original samples belonging to the selected first subset with the annotate-and-check process and then checking the one or more verification results with the human-annotated samples.

* * * * *